March 6, 1962 E. P. G. WRIGHT ET AL 3,024,448

STATIC ELECTRIC SWITCHES

Filed Sept. 20, 1956 3 Sheets-Sheet 1

Inventor
E.P.G.WRIGHT - J.D.REYNOLDS

By Robert Harding Jr.
Attorney

March 6, 1962 E. P. G. WRIGHT ET AL 3,024,448

STATIC ELECTRIC SWITCHES

Filed Sept. 20, 1956 3 Sheets-Sheet 2

Inventor
E.P.G.WRIGHT - J.D.REYNOLDS

By [signature]
Attorney

March 6, 1962 E. P. G. WRIGHT ET AL 3,024,448

STATIC ELECTRIC SWITCHES

Filed Sept. 20, 1956 3 Sheets-Sheet 3

Inventor
E.P.G. WRIGHT - J.D. REYNOLDS
By Robert Harding Jr.
Attorney

United States Patent Office
3,024,448
Patented Mar. 6, 1962

3,024,448
STATIC ELECTRIC SWITCHES
Esmond Philip Goodwin Wright and John David Reynolds, London, England, assignors to International Standard Electric Corporation, New York, N.Y.
Filed Sept. 20, 1956, Ser. No. 610,982
11 Claims. (Cl. 340—174.1)

The present invention relates to switching circuits employing bi-directional static electrical elements and is a modification of the invention described in British Patent No. 780,831, which issued November 27, 1957 to D. S. Ridler and J. D. Reynolds.

The term "bi-directional static electrical element" where used in this specification and claims means an electronic device having two transmission electrodes and a control electrode such that with suitable electrical connections to the control electrode, electrical signals can be transmitted in both directions between signal channels connected to the two transmission electrodes. This definition includes only those electrodes which are essential to the carrying out of the operating functions of the element.

Two examples of bi-directional static electrical elements are a so-called symmetrical transistor and a cold cathode tube having a single cathode and two anodes of the type described in the application of Beck, Serial No. 347,486, filed April 8, 1953, now Patent No. 2,775,-722. In this type of tube the single cathode constitutes the control electrode and the two anodes the two transmission electrodes.

In embodiments of the invention to be described below, the so-called symmetrical transistor is used. However, it is not essential (although it may be desirable) that the transistor should have identical characteristics in both directions of transmission. For this reason we prefer to use the term "bi-directional transistor." In each bi-directional transistor the base electrode constitutes the control electrode in the above definition and the other two electrodes (which may conveniently be referred to as emitter electrodes) the two transmission electrodes.

According to the present invention there is provided a switching circuit for establishing a bi-directional signal transmission path between two sets of circuits via two stages of bi-directional static electrical element switches wherein one set of circuits is divided into groups and each circuit of said one set is connected to a corresponding switch of one stage, the switches of which are therefore equal in number to the circuits of said one set, wherein each circuit of said other set of circuits has individual thereto and is multipled to a plurality of switches of said other stage equal in number to the number of groups of circuits in said one set, and wherein each switch of said other stage is multipled to one group of switches of said one stage, the interconnections being such that the switches of said other stage connected to one circuit of said other set are multipled to the different groups of switches of said one stage, and control circuits for operating pairs of switches, one from each stage, for seting up a bi-directional transmission path between any circuit of said one set and any circuit of said other set.

According to the present invention there is further provided a switching circuit comprising a pair of bi-directional static electric elements and a two condition circuit connected in the form of a T network, the transmission paths of said bi-directional static electrical elements being connected in series and forming the horizontal arm of said T network and said two condition circuit being connected to the junction of said pair of bi-directional static electrical elements and forming the vertical leg of said T network, said bi-directional static electrical elements and said two condition circuit each having an "on" state in which their impedance is low and an "off" state in which their impedance is high, means for applying control potentials to said T network in such a way that at one potential said pair of bi-directional static electrical elements are in their "on" state and said two condition circuit is in its "off" state and at a further potential said pair of bi-directional static electrical elements are in their "off" state and said two condition circuit is in its "on" state whereby when a pair of signal circuits are connected to the ends of said T network one to each signal, signals may be passed in either direction from one of said signal circuits, through said transmission paths to the other signal circuit during the period of said bi-directional static electrical signal elements are in their "on" state and said two condition circuit is in its "off" state, and substantially no signals may be passed between said signal circuits during the period said bi-directional static electrical elements are in their "off" state and said two condition circuit is in the "on" state.

The invention will now be described with reference to the accompanying drawings in which.

In the co-pending application of Ridler and Reynolds, Serial No. 448,005, referred to above, there is described a transistor switching device employing a single bi-directional transistor. For some applications, for example when it is undesirable to permit even a very small leakage, the impedance of this switch in its "off" state—i.e. the state in which the currents passed between the two emitter electrodes is low—is not high enough. This may be due to various causes such as the interelectrode capacity of the transistor.

In order to improve the impedance in the "off" state we have, according to the present invention, used two bi-directional transistors in series, and have also arranged for the junction between these transistors to be earthed by means of a two-condition circuit during the period the transistors are in their "off" state. During the "on" state of the transistors, the two-condition circuit isolates the junction from earth.

Figure 1:
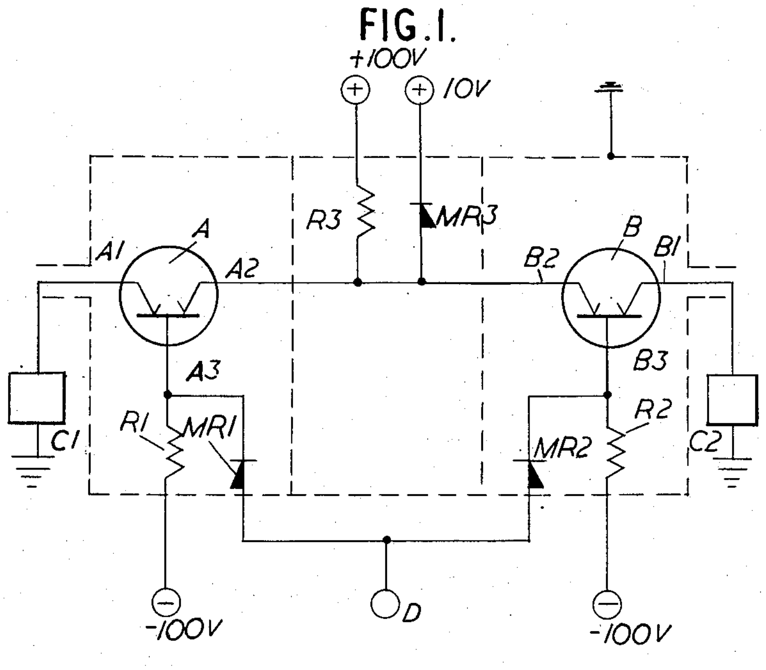
FIG. 1 shows a switching circuit employing two bi-directional transistors.

The method by which we perform this will be better understood by referring to FIG. 1 of the drawings.

The circuit of FIG. 1 employs two bi-directional transistors A and B. A bi-directional transistor has the property that the emitter and collector electrodes are interchangeable and, therefore, that signals may be passed through the transistor in either direction. That is to say, when both transistors A and B are in their low impedance condition, i.e. "on" state, signals may be passed from the circuit C1 through the transistors A and B to the circuit C2, or alternatively from the circuit C2 through the transistors B and A to C1.

The two-condition device comprises the resistor R3 and rectifier MR3 connected between the commoned emitter electrodes (A2 and B2) and 100 v. and 10 v. positive supplies respectively; the rectifier MR3 having its positive plate connected to the emitter electrodes and its negative plate connected to the 10 v. positive supply.

With the transistors A and B in their "off" state, current flows from the 100 v. supply through the resistor R3 and rectifier MR3 in series to the 10 v. supply: thus rectifier MR3 is biassed to its low impedance condition and the potential on the emitter electrode A2 and B2 is approximately 10 v. The impedance between the emitters A2 and B2 and earth, however, is substantially that of the forward impedance of the rectifier MR3; that is, a low impedance.

When the transistors A and B are switched to their "on" state the potential on the emitter electrodes A2 and B2 falls towards earth potential due to the low impedance between the emitter electrodes A1, A2 and B1, B2 of the transistors, and the low impedance of the circuits C1 and C2. The rectifier MR3 is, therefore, biassed into its high impedance condition and the current from the 100 v. positive supply flows through the resistor R3 and the two transistors A and B and their respective circuit C1 and C2.

Thus the two-condition circuit becomes a high impedance and so does not shunt the transistor A and B when they are in their "on" state.

The switching "on" and "off" of the transistors A and B is performed by applying biassing potentials to the control terminal D which, through the rectifier MR1 and MR2, control the base potentials of transistors A and B respectively. To switch the transistors into their "off" state the potential on the control terminal D is raised to +12 v. With this potential the rectifier MR1 and MR2 are biassed into their low impedance condition so that the base electrodes A3 and B3 of the two transistors are at approximately 12 v. Since emitters A2 and B2 are at about +10 v. and emitters A1 and B1 at earth (zero) potential, the base electrodes of both transistors are positive with respect to their emitters which is the condition for a high impedance between the electrodes of the two transistors.

To switch the transistors into their "on" state the potential on the control terminal D is lowered to −12 v. This lowers the potential on the base electrodes of the two transistors to below earth (zero) potential which means that the emitter electrodes are positive with respect to the base electrodes and the transistors switch over to their "on" or low impedance state.

The switching circuit may be screened as shown by the dotted lines in FIG. 1.

In a practical example the resistors R1 and R2 are 47K Ω and the resistor R3 100K Ω.

Figure 2:
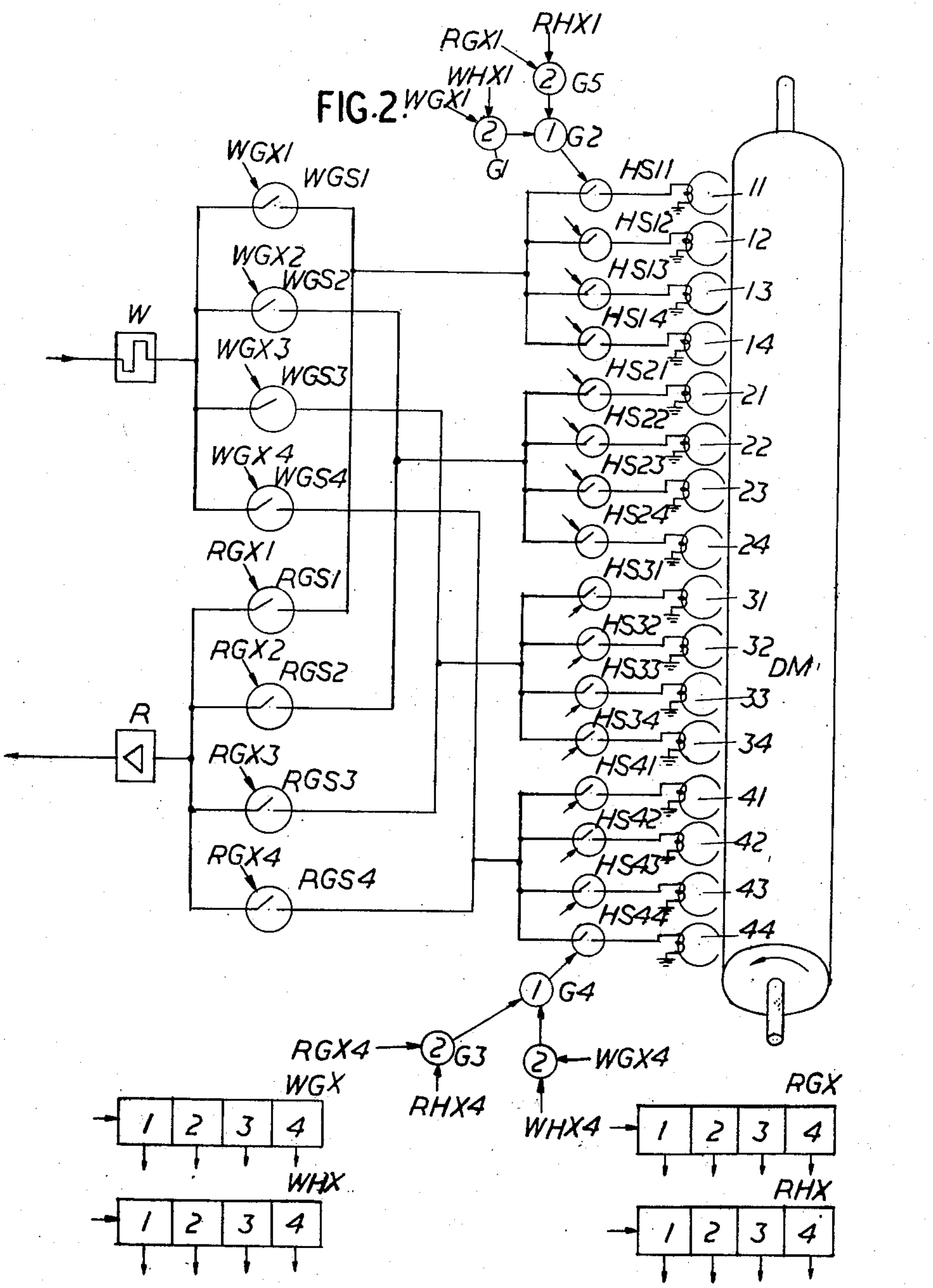
FIG. 2 shows a means for switching a common writing circuit and a common recording circuit to any one of a number of heads associated with a magnetic drum.

In FIG. 4 of the above co-pending application there is illustrated a method of controlling the switching among the read/record heads of a magnetic drum; each switch employing a single bi-directional transistor. FIG. 2 of the present invention shows in schematic form a modification of that switching method which enables reading to be performed at one head while at the same time recording is taking place at another head. This circuit is particularly applicable to the phase technique of recording.

The drum DM has arranged around its periphery 16 magnetic read/record heads divided into four groups: 11–14, 21–24, 31–34 and 41–44. Generally, each head will control the reading and recording on a particular drum track allocated to that head.

Each head in a group is connected via a head switch (e.g. HS11, HS12, HS13 and HS14 for heads 11, 12, 13 and 14) to a writing group switch (e.g. WGS1) and a reading group switch (e.g. RGS1) which are common to all the heads in the group. A writing circuit W is connected in common to all the writing group switches WGS1, WGS2, WGS3 and WGS4 and a reading amplifier R is connected in common to all the reading group switches RGS1, RGS2, RGS3 and RGS4.

The opening and closing of these switches is controlled by registers which are shown in schematic form at the bottom of FIG. 2. These registers may be any form of distributor such as, for example, relay, gas tube, crystal triode or vacuum tube counting chains, or other step-by-step devices. The write group register WGX and read group register RGX each have four stages. Each stage of the write group register controls one of the four write group switches WGS1–4 and each stage of the read group register controls one of the read group switches RGS1–4. Thus if, for example, the write group register WGX is stepped to position 3 then it will apply a control potential to the write group switch WGS3 to close that switch and allow signals to be passed from the circuit W to the head switches HS31–34. Similarly, when the read group register RGX is at position 2 a control potential will be applied to the read group switch RGS2 to close that switch and allow signals from the head switches HS21–24 to pass to the reading amplifier R.

The write head register WHX, in conjunction with the write group register WGX, selects through a gating circuit one of the 16 head switches, and applies a control potential to close the selected head switch, thus connecting the selected head to the write group switch and completing a circuit between the writing circuit W and the selected head. In the same way the reading head register RHX, in conjunction with the reading group register, closes the appropriate head switch to complete the circuit between the read amplifier R and the selected head.

It will be observed in FIG. 2 that only two gating circuits are illustrated; those connected to the head switches HS11 and HS44. This is in order to simplify the figure, but it will be clear that similar gates are connected to each of the head switches.

The operation of the system will be better understood by taking a specific example. Let it be assumed that it is required to write through head 11 and read from head 44.

To write through head 11 the write group switch WGS1 and the head switch HS11 must be closed.

The write group register WGX is stepped to position 1 and through its control WGX1 the write group switch WGS1 is closed. The write head register WHX is now stepped to position 1. Gate G.1 opens due to the coincidence of WGX1 and WHX1, and, through gate G.2, closes the head switch HS11. A circuit is now completed for the writing circuit W, through write group switch WGS1 and head switch HS11 to the head 11 so that signals may be recorded upon the track traversed by the head 11.

To complete a reading circuit from head 44, the read group register RGX is stepped to position 4 so that it closes the read group switch RGS4 through its control lead RGX4. The read head register RHX is also stepped to position 4 so that its control lead RHX4, in conjunction with the already operated RGX4, opens gate G.3 and, through gate G.4, closes the head switch HS44. Thus a reading circuit has been completed from the head 44, through the head switch HS44 and the group switch RGS4 to the read amplifier R.

It will be observed that by dividing the read/record heads into groups and controlling each group by a separate read and write group switch, it is possible to write through any head in a group and at the same time read from a head in one of the other groups. Thus, in the above example, while writing through head 11 we can read from head 44 (or indeed from any of the heads 21 to 44) at the same time.

Figure 3:
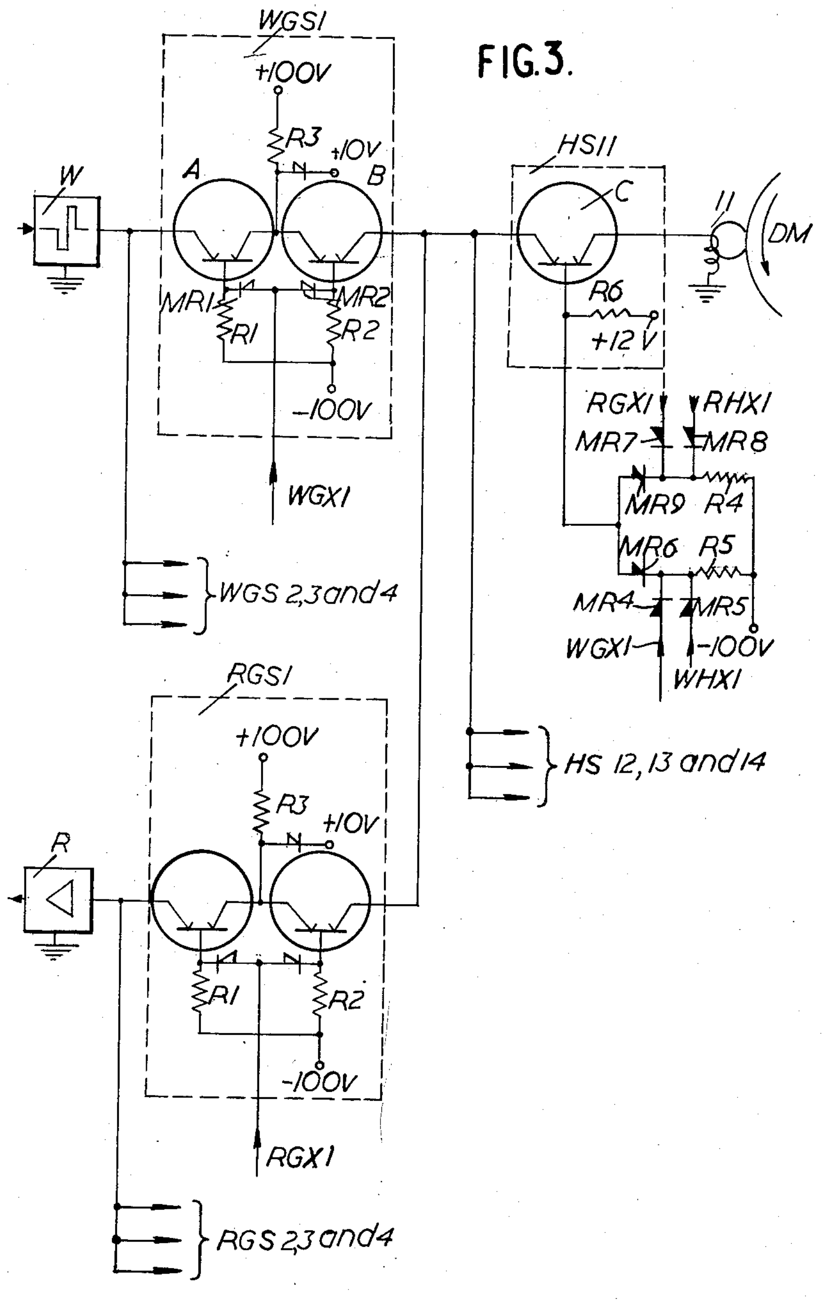
FIG. 3 shows how a bi-directional transistor switch of the type shown in FIG. 1 may be used in a drum storage system of the type shown in FIG. 2.

FIG. 3 shows how a switch employing two bi-directional transistors of the type shown in FIG. 1 may be used as write group switches and read group switches in a drum storage system of the type described above with reference to FIG. 2.

For clarity only one write group switch WGS1, one read group switch RGS1 and one head switch HS11 are shown in FIG. 3. It will be realised that the other write group switches and read group switches will each comprise a switch employing two bi-directional transistors identical to WGS1 and RGS1 and that all the other head switches will comprise a switch employing only one bi-directional transistor identical to HS11.

The head switch HS11 employs a one bi-directional transistor C which is arranged to have two conditions: an "on" condition in which its base electrode is at a negative potential with respect to earth potential and the impedance between the two emitter electrodes is low, and an "off" condition in which the base electrode is at a positive potential with respect to earth potential and the impedance between the two emitter electrodes is high.

The base potential of the transistor C is controlled by a gating circuit comprising six rectifier MR4–9 and resistors R4 and R5. This gating circuit corresponds to the gates G1, G2, G3 and G5 in FIG. 2.

The normal condition of the transistor C is the "off" condition. To achieve this the potentials on the control leads WGX1, WHX1, RGX1 and RHX1 of the gating circuit are positive with respect to earth. Under these conditions current flows over the control leads through the rectifiers MR4, MR5, MR7 and MR8, and through the resistors R4 and R5 to −100 v. Since the rectifiers MR4, 5, 7 and 8 are conducting, the potential on the negative plate of the rectifiers MR6 and MR9 is approximately that of the potentials on the control leads WGX1, WHX1, RGX1 and RHX1. These potentials are so chosen that with the rectifiers MR4, 5, 7 and 8 conducting, the rectifiers MR6 and MR9 are biassed into their non-conductive conditions so that potential at the base of transistor C becomes that of the +12 v. supply less any small potential drop across the resistor R6.

If, for example, it is now required to write through head 11, both the switches WGS1 and HS11 must be switched "on." As has already been seen, to do this the write group register WGX is stepped to position 1. In this position a negative potential is applied over the control lead WGX1 of the write group switch WGS1 to the junction of the rectifiers MR1 and MR2. The two bi-directional transistors A and B become conductive and WGS1 "opens" to allow signals from the write circuit W to pass to the head switch HS11.

The control potential on the lead WGX1 is also applied to the rectifier MR4 in the gating circuit controlling the head switch HS11 thus biassing this rectifier to its non-conducting condition. Since rectifier MR5 is still conducting the change in condition of MR4 does not alter the condition of rectifier MR6. The write head register WHX is now stepped to position 1. In this position a negative potential is applied over the control lead WHX1 to bias the rectifier MR5 into its non-conducting region. Since the rectifier MR4 is already in its non-conducting condition, the potential at the junction between rectifier MR6 and resistor R5 falls and the rectifier MR6 becomes conductive. Current now flows from the +12 v. supply through the resistor R6, rectifier MR6 and resistor R5 to −100 v. Since rectifier MR6 is in its low impedance condition the base electrode of the bi-directional transistor C becomes negative with respect to earth thus providing the conditions for putting the transistor C into its "on" condition. The signals from the write circuit W are now able to pass through the transistor C to the head 11 where they are recorded on the drum DM.

Although no protective arrangements have been shown in FIGS. 2 and 3 it will be clear to those skilled in the art that some protective measures will normally be provided. For example, a protective circuit would be provided for ensuring that two head switches in a group were not opened at the same time. Similarly other circuits would ensure that both the write group switch and read group switch in one group were not opened at the same time.

While the principles of the invention have been described above in connection with specific embodiments, and particular modifications thereof, it is to be clearly understood that this description is made only by way of example and not as a limitation on the scope of the invention.

What is claimed is:

1. A switching circuit comprising a pair of bi-directional static electrical elements and a two condition circuit connected in the form of a T network, the transmission paths of said bi-directional static electrical elements being connected in series and forming the horizontal arm of said T network and said two condition circuit being connected to the junction of said pair of bi-directional static electrical elements and forming the vertical leg of said T network, said bi-directional static electrical elements and said two condition circuit each having an "on" state in which their impedance is low and an "off" state in which their impedance is high, and means for applying control potentials to said T network in such a way that at one potential said pair of bi-directional static electrical elements are in their "on" state and said two condition circuit is in its "off" state and at a further potential said pair of bi-directional static electrical elements are in their "off" state and said two condition circuit is in its "on" state, a signal circuit connected to each end of said T network whereby signals may be passed in either direction from one of said signal circuits, through said transmission paths, to the other signal circuits during the period of said bi-directional static electrical signal elements are in their "on" state and said two condition circuit is in its "off" state, and substantially no signals may be passed between said signal circuits during the period said bi-directional static elements are in their "off" state and said two condition circuit is in the "on" state.

2. A switching circuit, as claimed in claim 1, wherein both of the bi-directional static electrical elements are bi-directional transistors each having two emitter electrodes and a base electrode, and wherein an emitter electrode of one bi-directional transistor is connected to an emitter electrode of the other bi-directional transistor, said two condition circuit comprising a resistor having one end connected to the commoned emitter electrodes and its other end to a first source of positive potential, and a rectifier having its positive plate connected to the commoned emitters and its negative plate connected to a second source of positive potential, said first source positive potential being greater than said second source positive potential.

3. A switching circuit, as claimed in claim 2, wherein said means for applying control potentials applies said potentials to the base electrodes of said bi-directional transistors.

4. A switching circuit comprising a pair of bi-directional transistors each having a first emitter electrode, a second emitter electrode, and a base electrode, a resistor interconnecting the base of each bi-directional transistor and a source of negative potential, a direct connection between said first emitter of one bi-directional transistor and said first emitter of the other bi-directional transistor, a first source of positive potential, a resistor interconnecting said direct connection and said first source of positive potential, a second source of positive potential, a first rectifier having its positive plate connected to said direct connection and its negative plate connected to said second source of positive potential, said first source of positive potential being greater than said second source of positive potential, a pair of rectifiers having their negative plates connected to the base electrodes of said bi-directional transistors, one to each, and their positive plates connected together, means connected to said positive plates of said pair of rectifiers for applying control potentials to said switching circuit, means for connecting a first signal circuit between the second emitter electrode of one of said bi-directional transistors and a point of substantially zero potential on said first source of positive potential, and means for connecting a second signal circuit between the second emitter electrode of the other of said bi-directional transistors and a point of substantially zero potential on said first source of positive potential, whereby when a negative potential is applied to said control means, said bi-directional transistors are switched to their low impedance condition and said first rectifier is switched to its high impedance condition and signals may be transmitted in either direction between said first signal circuit and said second signal circuit via said pair of bi-directional transistors, and when a positive potential is applied to said control means, said bi-directional transistors are switched to their high impedance condition and said first rectifier is switched to its low impedance condition and substantially no transmission can take place in either direction between said first signal circuit and said second signal circuit.

5. A switching circuit for establishing a bi-directional signal transmission path between any one of a plurality of magnetic read/record heads and either a writing circuit or a reading circuit comprising a plurality of magnetic read/record heads arranged in groups, a writing circuit, a reading circuit, a plurality of intermediate circuits each individual to a different group of said read/record heads, a plurality of first stage bi-directional static electrical element switches arranged in two groups, one for said writing circuit and one for said reading circuit, means for connecting corresponding switches of each group to different ones of said intermediate circuits, said writing circuit being multipled to all the switches of one group and said reading circuit being multipled to all the switches of the other group, a plurality of second stage bi-directional static electrical element switches arranged in groups, there being one group for each group of read/record heads the switches of each group being connected respectively to the read/record heads of the corresponding group, the switches of each group being multipled to the corresponding one of said intermediate circuits, and means for applying switching potentials simultaneously to one of said first stage switches and one of said second stage switches for setting up a bi-directional transmission path between a read/record head and either said writing or reading circuits.

6. A switching circuit, as claimed in claim 5, wherein the means for applying switching potentials includes means for applying said potentials to two switches of each stage in different groups for establishing two bi-directional paths, one between a selected read/record head and the writing circuit and the other between a selected read/record head in another group and said reading circuit.

7. A switching circuit, as claimed in claim 5, in which each of the bi-directional static electrical element switches comprises a pair of bi-directional static electrical elements and a two condition circuit connected in the form of a T network, the transmission paths of said bi-directional static electrical elements being connected in series and forming the horizontal arm of said T network and said two condition circuit being connected to the junction of said pair of bi-directional static electrical elements and forming the vertical leg of said T network, said bi-directional static electrical elements and said two condition circuit each having an "on" state in which their impedance is low and an "off" state in which their impedance is high, the said switching potentials applied to the first and second stage switches comprises one potential causing said pair of bi-directional static electrical elements to assume their "on" state and said two condition circuit to assume its "off" state and at a further potential causing said pair of bi-directional static electrical elements to assume their "off" state and said two condition circuit to assume its "on" state, a signal circuit connected to each end of said T network whereby signals may be passed in either direction from one of said signal circuits, through said transmission paths, to the other signal circuit during the period of said bi-directional static electrical signal elements are in their "on" state and said two condition circuit is in its "off" state, and substantially no signals may be passed between said signal circuits during the period said bi-directional static electrical elements are in their "off" state and said two condition circuit is in the "on" state.

8. A switching circuit, as claimed in claim 7, in which each bi-directional static electrical element switch is a symmetrical transistor.

9. In a switching system, groups of individual recorders and respectively corresponding groups of individual recorder switches, each switch being connected to a separate recorder, a group of input switches and a group of output switches each containing a separate switch for each group of recorders, means multipling the input switches with respectively corresponding output switches, links interconnecting each multipled input and output switch with all the recorder switches in the corresponding group of recorder switches, an input line and an output line and means connecting them to respective groups of input and output switches, and control means for establishing a connection between the input line and any selected recorder through its associated recorder switch and the input switch corresponding to the recorder group containing the selected recorder, and for establishing a simultaneous connection between the output line and any selected recorder in any recorder group not in use, through its associated recorder switch and the output switches corresponding to the recorder group containing the last-said recorder.

10. A switching system according to claim 9, wherein the said input and output switches are bi-directional.

11. A switching system according to claim 10, wherein the said input and output switches comprise a pair of series-related bi-directional static switching elements each having an "on" state in which their impedance is low and having an "off" state in which their impedance is high, the said high impedance of either switching element being insufficient to block signals appearing on the input and output lines, circuit means, and means for energizing said circuit means when the said elements are in the "off" condition for shunting the said signals and for disabling the said circuit means when the said elements are in the "on" condition to permit passage of all signals appearing on the said lines.

References Cited in the file of this patent

UNITED STATES PATENTS

| | | |
|---|---|---|
| 2,369,474 | Luhn | Feb. 13, 1945 |
| 2,587,532 | Schmidt | Feb. 26, 1952 |
| 2,676,271 | Baldwin | Apr. 20, 1954 |
| 2,728,857 | Sziklai | Dec. 27, 1955 |
| 2,816,238 | Elliot | Dec. 10, 1957 |
| 2,835,743 | Muffey | May 20, 1958 |
| 2,853,693 | Lindenblad | Sept. 23, 1958 |
| 2,874,371 | Foster | Feb. 17, 1959 |